(12) United States Patent
Du et al.

(10) Patent No.: US 10,121,075 B2
(45) Date of Patent: Nov. 6, 2018

(54) METHOD AND APPARATUS FOR EARLY WARNING OF DANGER

(71) Applicant: SAMSUNG ELECTRONICS CO., LTD., Suwon-si (KR)

(72) Inventors: Xiaoyi Du, Beijing (CN); Hengliang Luo, Beijing (CN); Haifeng Deng, Beijing (CN); Li Zhang, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/525,218

(22) PCT Filed: Oct. 20, 2015

(86) PCT No.: PCT/KR2015/011083
§ 371 (c)(1),
(2) Date: May 8, 2017

(87) PCT Pub. No.: WO2016/072644
PCT Pub. Date: May 12, 2016

(65) Prior Publication Data
US 2017/0323161 A1    Nov. 9, 2017

(30) Foreign Application Priority Data

Nov. 6, 2014  (CN) .......................... 2014 1 0638409
Sep. 25, 2015  (KR) ........................ 10-2015-0137084

(51) Int. Cl.
*G08B 23/00*  (2006.01)
*G06K 9/00*  (2006.01)
(Continued)

(52) U.S. Cl.
CPC ......... *G06K 9/00671* (2013.01); *G06F 3/012* (2013.01); *G06K 9/00302* (2013.01); *G08B 21/02* (2013.01)

(58) Field of Classification Search
CPC .... A62B 7/00; A61B 5/0002; G06K 9/00671; G06K 9/00228; G02B 27/0176;
(Continued)

(56) References Cited

U.S. PATENT DOCUMENTS 7,800,493 B2 *  9/2010  Terauchi .............. A61B 5/0002
                                                        128/903
7,921,036 B1    4/2011  Sharma et al.
(Continued)

FOREIGN PATENT DOCUMENTS

CN        101108125 A       1/2008
CN        101714208 A       5/2010
(Continued)

OTHER PUBLICATIONS

Communication dated Aug. 3, 2017 by the State Intellectual Property Office of P.R. China in counterpart Chinese Patent Application No. 201410638409.6.
(Continued)

*Primary Examiner* — Hoi Lau
(74) *Attorney, Agent, or Firm* — Sughrue Mion, PLLC

(57) ABSTRACT

Provided are a method and an apparatus for early warning of danger, the method including acquiring image information of a target object through a first wearable device worn by a user, detecting a physical characteristic of the target object based on the acquired image information, determining a degree of danger that is a degree to which safety of the user is endangered, by using the detected physical characteristic, and providing a warning to the user based on the determined degree of danger of an event.

17 Claims, 8 Drawing Sheets

(51) Int. Cl.
*G08B 21/02* (2006.01)
*G06F 3/01* (2006.01)

(58) Field of Classification Search
CPC ... G02B 27/017; G02B 27/0093; G06F 1/163; G08B 13/19621; G08B 21/10; G08B 3/10; G08G 1/04; H04N 7/147; H04N 5/23245
USPC ............... 340/632, 573.1; 348/143, 158, 8; 382/103
See application file for complete search history.

(56) References Cited

U.S. PATENT DOCUMENTS

| | | | |
|---|---|---|---|
| 2002/0190866 A1* | 12/2002 | Richardson | A62B 7/00 340/632 |
| 2005/0001727 A1* | 1/2005 | Terauchi | A61B 5/0002 340/573.1 |
| 2007/0009234 A1 | 1/2007 | Van De Sluis | |
| 2008/0030580 A1* | 2/2008 | Kashiwa | G08B 13/19621 348/158 |
| 2008/0055410 A1* | 3/2008 | DeKeyser | G08B 13/19621 348/143 |
| 2009/0002567 A1 | 1/2009 | Maruyama et al. | |
| 2010/0080418 A1* | 4/2010 | Ito | G06K 9/00228 382/103 |
| 2011/0288379 A1 | 11/2011 | Wu | |
| 2013/0141576 A1* | 6/2013 | Lord | G08G 1/04 348/148 |
| 2013/0142347 A1 | 6/2013 | Lord et al. | |
| 2014/0043212 A1* | 2/2014 | Park | G02B 27/017 345/8 |
| 2014/0043213 A1* | 2/2014 | Park | G02B 27/0176 345/8 |
| 2014/0043214 A1* | 2/2014 | Park | G06F 1/163 345/8 |
| 2014/0118498 A1 | 5/2014 | Lee et al. | |
| 2015/0054716 A1* | 2/2015 | Hirabayashi | G02B 27/0093 345/8 |
| 2016/0112636 A1* | 4/2016 | Yamaguchi | H04N 5/23245 348/158 |
| 2017/0195640 A1* | 7/2017 | Pasternak | G10L 15/265 |
| 2017/0214887 A1* | 7/2017 | Edwards | H04N 7/147 |
| 2017/0323161 A1* | 11/2017 | Du | G06K 9/00671 |
| 2018/0053394 A1* | 2/2018 | Gersten | G08B 21/10 |
| 2018/0075712 A1* | 3/2018 | Field | G08B 3/10 |
| 2018/0082085 A1* | 3/2018 | Yau | G06F 21/74 |

FOREIGN PATENT DOCUMENTS

| | | |
|---|---|---|
| CN | 103106374 A | 5/2013 |
| JP | 201081480 A | 4/2010 |
| JP | 2013171476 A | 9/2013 |
| KR | 101033037 B1 | 5/2011 |
| KR | 1020140024712 A | 3/2014 |
| KR | 101395614 B1 | 5/2014 |

OTHER PUBLICATIONS

International Search Report and Written Opinion dated Feb. 5, 2016, issued by the International Searching Authority in counterpart International Application No. PCT/KR2015/011083 (PCT/ISA/210 & PCT/ISA/237).

Communication dated Dec. 15, 2017, issued by the European Patent Office in counterpart European Patent Application No. 15857475.6.

* cited by examiner

METHOD AND APPARATUS FOR EARLY WARNING OF DANGER

TECHNICAL FIELD

The present disclosure relates to a method and an apparatus for early warning of danger.

BACKGROUND ART

There are some wearable devices, such as a head-mounted display (HMD), which is capable of detecting a dangerous object, such as a vehicle, and is capable of sending out warning information. In such devices, an image signal is used to detect danger from a vehicle. Moreover, there are some other wearable devices, which use an audio signal to detect the danger and then provide warning information.

DETAILED DESCRIPTION OF THE INVENTION

Technical Problem

The present disclosure relates to a method and an apparatus for early warning of danger. Also, the present disclosure provides a computer program, which is combined with hardware and stored in a medium, to perform the method.

Technical Solution

In an aspect, a method for early warning of danger, performed by a wearable device, includes: acquiring image information of a target object; detecting a physical characteristic of the target object based on the acquired image information; determining a degree of danger that is a degree to which safety of a user is endangered, by using the detected physical characteristic; and providing a warning to the user based on the determined degree of danger of an event.

The acquiring of the image information may include: acquiring audio information of a surrounding environment, and wherein the detecting of the physical characteristic comprises: detecting an audio characteristic based on the acquired audio information.

The determining of the degree of danger may include: determining a time taken by the target object to reach the wearable device based on the image information; and determining the degree of danger with respect to the target object according to at least one of the physical characteristic of the target object, the time taken by the target object to reach the wearable device, and the audio characteristic of the target object.

The physical characteristic of the target object may include a face of a person, a trunk of the person, limbs of the person, teeth of an animal, a tail of the animal, or eyes of the animal.

The audio characteristic of the target object may include at least one of a volume, a pitch, a Mel Frequency Cepstrum Coefficient (MFCC), a human speech, and a Power Normalized Cepstral Coefficient (PNCC).

The acquiring of the image information may include: acquiring weather information or odor information, wherein the determining of the degree of danger comprises: determining the degree of danger based on the weather information or the odor information.

The providing of the warning may include: providing the warning in different ways according to the degree of danger.

The method may further include: receiving the acquired image information or audio information through a second wearable device, wherein the determining of the degree of danger comprises: determining the degree of danger based on information received from the second wearable device.

The detecting of the physical characteristic may include: detecting whether the target object is a person by using the image information; and if the target object is the person, detecting a face of the person, and wherein the determining of the degree of danger comprises: determining the degree of danger according to whether the detected face is included in a preset face database.

In another aspect, a computer-readable recording medium having recorded thereon a program, which, when executed by a computer, performs the method.

In another aspect, a wearable device for early warning of danger includes a sensing unit configured to acquire image information of a target object; a characteristic detection unit configured to detect a physical characteristic of the target object based on the acquired image information; a danger degree determining unit configured to determine a degree of danger that is a degree to which safety of a user is endangered, by using the detected physical characteristic; and a warning unit configured to warn the user based on the determined degree of danger of an event.

The sensing unit acquires audio information of a surrounding environment, wherein the characteristic detection unit detects an audio characteristic based on the acquired audio information.

The danger degree determining unit may determine a time taken by the target object to reach the wearable device based on the image information and determines the degree of danger with respect to the target object according to at least one of the physical characteristic of the target object, the time taken by the target object to reach the wearable device, and the audio characteristic of the target object.

The physical characteristic of the target object may include a face of a person, a trunk of the person, limbs of the person, teeth of an animal, a tail of the animal, or eyes of the animal.

The audio characteristic of the target object may include at least one of a volume, a pitch, a Mel Frequency Cepstrum Coefficient (MFCC), human speech, and a Power Normalized Cepstral Coefficient (PNCC).

The sensing unit may acquire weather information or odor information, wherein the danger degree determining unit determines the degree of danger based on the weather information or the odor information.

The warning unit may provide the warning in different ways according to the degree of danger.

The wearable device may further include: a receiving unit configured to receive the acquired image information or audio information through a second wearable device, wherein the danger degree determining unit determines the degree of danger based on information received from the second wearable device.

The characteristic detection unit may detect whether the target object is a person by using the image information and, if the target object is the person, detects a face of the person, wherein the danger degree determining unit determines the degree of danger according to whether the detected face is included in a preset face database.

MODE OF THE INVENTION

Figure 1:
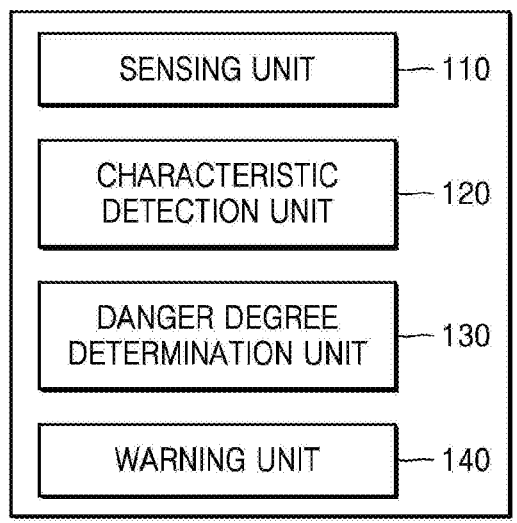
FIG. 1 is a block diagram showing an apparatus for early warning of danger, according to an embodiment of the present application.

Reference will now be made in detail to embodiments, examples of which are illustrated in the accompanying drawings. In this regard, the present embodiments may have different forms and should not be construed as being limited to the descriptions set forth herein. Rather, these embodiments are provided so that this disclosure will be thorough and complete and will fully convey the concept of the invention to those of ordinary skill in the art, and the present disclosure will only be defined by the appended claims.

Terminologies used in the present specification will be briefly described, and then the detailed description of the present disclosure will be given.

With respect to the terms in the various embodiments of the present disclosure, the general terms which are currently and widely used are selected in consideration of functions of structural elements in the various embodiments of the present disclosure. However, meanings of the terms may be changed according to intention, a judicial precedent, appearance of a new technology, and the like. In addition, in certain cases, a term which is not commonly used may be selected. In such a case, the meaning of the term will be described in detail at the corresponding part in the description of the present disclosure. Therefore, the terms used in the various embodiments of the present disclosure should be defined based on the meanings of the terms and the descriptions provided herein.

In addition, unless explicitly described to the contrary, the word "include" and variations such as "includes" or "comprising" will be understood to imply the inclusion of stated elements but not the exclusion of any other elements. In addition, the term "units" described in the specification mean units for processing at least one function and operation and may be implemented by software components or hardware components, such as a field programmable gate array (FPGA) or an application specific integrated circuit (ASIC). However, the "units" are not limited to software components or hardware components. The "units" may be embodied on a recording medium and may be configured to operate one or more processors. Therefore, for example, the "units" may include components, such as software components, object-oriented software components, class components, and task components, processes, functions, properties, procedures, subroutines, program code segments, drivers, firmware, micro codes, circuits, data, databases, data structures, tables, arrays, and variables. Components and functions provided in the "units" may be combined to smaller numbers of components and "units" or may be further divided into larger numbers of components and "units."

The present disclosure will now be described more fully with reference to the accompanying drawings, in which embodiments of the present disclosure are shown. In the description of the present disclosure, certain detailed explanations of related art are omitted when it is deemed that they may unnecessarily obscure the essence of the present disclosure.

FIG. 1 is a block diagram showing an apparatus for early warning of danger (hereinafter, early danger warning apparatus), according to an embodiment of the present application.

Referring to FIG. 1, a wearable device 100 for early warning of danger includes a sensing unit 110, a characteristic detection unit 120, a danger degree determination unit 130, and a warning unit 140. The wearable device 100 may include a head mount display, smart glasses, or a smart watch.

The sensing unit 110 may acquire image information of a target object. Also, the sensing unit 110 may acquire audio information of a surrounding environment. The sensing unit 110 may acquire weather information or odor information. In addition, the sensing unit 110 may acquire biological information of a user through a first wearable device.

The characteristic detection unit 120 may detect a physical characteristic of the target object based on the acquired image information. Also, the characteristic detection unit 120 may detect an audio characteristic based on the acquired audio information. The audio characteristic of the target object may include at least one of a volume, a pitch, a Mel Frequency Cepstrum Coefficient (MFCC), human speech, a Power Normalized Cepstral Coefficient (PNCC), etc. The characteristic detection unit 120 may detect whether the target object is a person by using the image information. When the target object is a person, the characteristic detection unit 120 may detect a face of the person.

The danger degree determination unit 130 may determine a degree of danger to which safety of the user is endangered, by using the detected physical characteristic. Also, the danger degree determination unit 130 may determine a time taken by the target object to reach the first wearable device based on the image information. The danger degree determination unit 130 may determine a degree of danger with respect to the target object according to at least one of the physical characteristic of the target object, the time taken by the target object to reach the first wearable device, and the audio characteristic of the target object. Also, the danger degree determination unit 130 may determine the degree of danger based on the weather information or the odor information. For example, when it is a rainy day, it is easy to skid due to slippery road conditions, therefore, the degree of danger may be raised. Alternatively, when a concentration of a toxic gas in the air is high, the degree of danger also may be raised. The danger degree determination unit 130 may determine the degree of danger based on the biological information. Also, the danger degree determination unit 130 may determine the degree of danger according to whether the detected face is included in a preset face database.

The warning unit 140 may provide a warning to the user based on the determined degree of danger of an event. Also, the warning unit 140 may provide the warning according to the biological information. For example, when a blood pressure of the user rapidly drops, the warning unit 140 may provide the warning to the user. Also, the warning unit 140 may provide different manners of warnings according to degrees of danger. For example, when the degree of danger is low, the warning unit 140 may warn the user via a weak vibration, and when the degree of danger is high, the warning unit 140 may warn the user via a strong vibration. As another example, when the degree of danger is low, a warning sound may be repeated slowly, and when the degree of danger is high, the warning sound may be repeated quickly. In addition, embodiments in which warnings are variously provided in different manners according to degrees of danger are possible.

Figure 2:
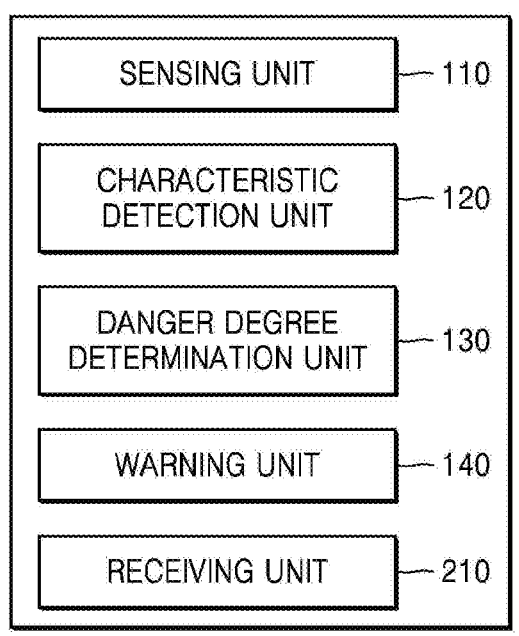
FIG. 2 is a block diagram showing an apparatus for early warning of danger, according to another embodiment of the present application.

FIG. 2 is a block diagram showing an early danger warning apparatus 200 according to another embodiment of the present application.

Referring to FIG. 2, the early danger warning apparatus 200 includes the sensing unit 110, the characteristic detection unit 120, the danger degree determination unit 130, the warning unit 140, and a receiving unit 210.

Descriptions of the sensing unit 110, the characteristic detection unit 120, the danger degree determination unit 130, and the warning unit 140 of FIG. 2 are the same as those of the configurations of FIG. 1. The receiving unit 210 may receive information acquired through a second wearable device. In this regard, the information may include at least one of biological information of a second user and image information and audio information that are acquired by the second wearable device. Also, the danger degree determination unit 130 may determine a degree of danger based on information received from the second wearable device.

In addition, a likelihood of fraud may be determined by analyzing speech content, a change in a facial expression characteristic, or an action switch based on a fraud reference model. The danger degree determination unit 130 may determine the degree of danger based on the determined likelihood of fraud.

Figure 3:
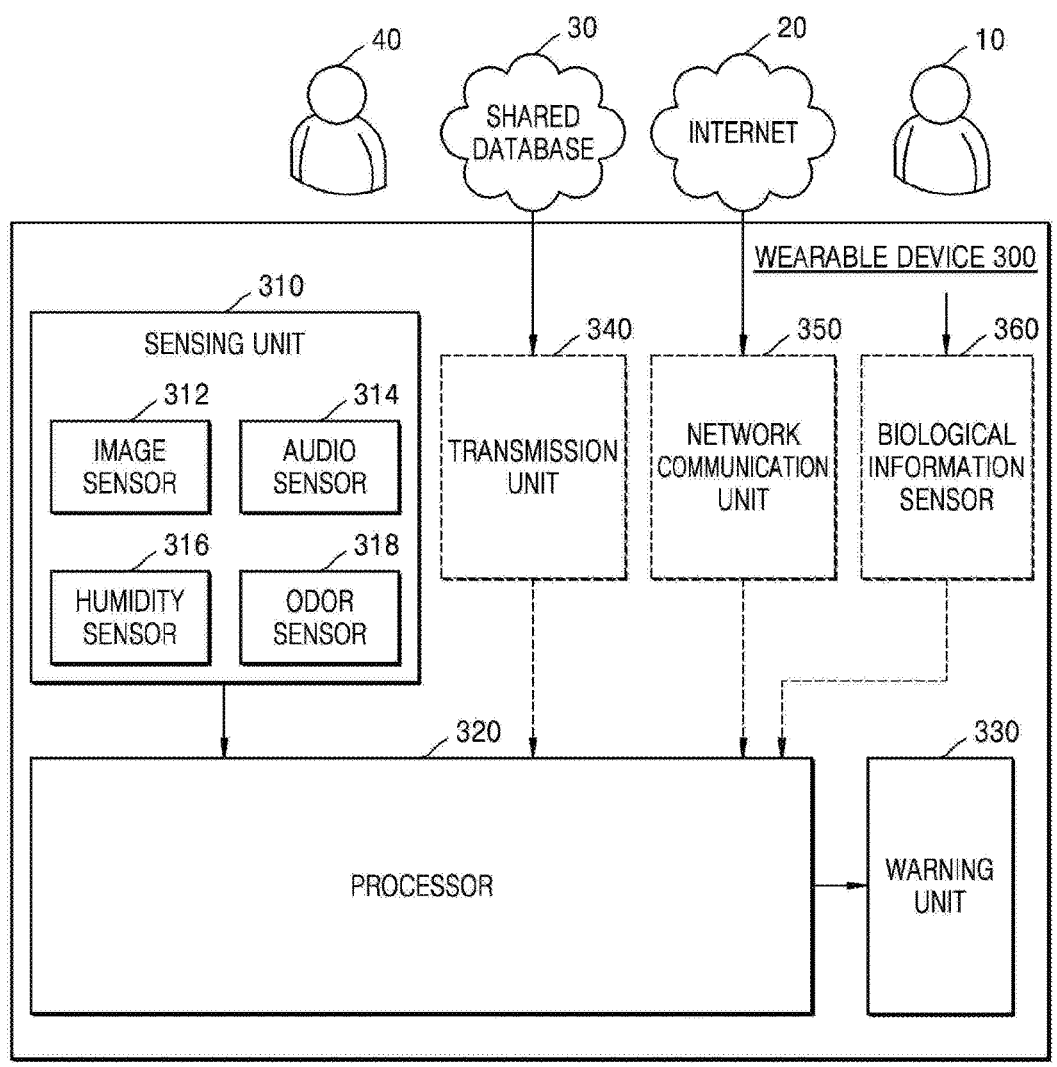
FIG. 3 is a block diagram showing an apparatus for early warning of danger, according to another embodiment of the present application.

FIG. 3 is a block diagram showing an early danger warning apparatus according to another embodiment of the present application.

As shown in FIG. 3, a wearable device 300 may include a sensing unit 310, a processor 320, and a warning unit 330. In this regard, the wearable device 300 may correspond to the wearable device 100 for early warning of danger, shown in FIG. 1.

The sensing unit 310 may include various sensors for sensing different types of information. In general, the sensing unit 310 includes an image sensor 312, an audio sensor 314, a humidity sensor 316, and an odor sensor 318.

The image sensor 312, also known as a photosensitive element, is a device converting an optical image into an electronic signal. In the present embodiment, the image sensor 312 may be used to acquire real-time image information of a surrounding environment. Also, the wearable device 300 may include a camera. The image sensor 312 may be included in the camera. The real-time image information may include information about any surrounding environment that may endanger the safety of the user. For example, the real-time image information may include, but is not limited to, information about a road condition, a vehicle-operating condition, nearby creatures including humans and animals.

The audio sensor 314 may include a pickup device or an array of pickups. In the present embodiment, the audio sensor 314 may be used to acquire real-time audio information of the surrounding environment. The real-time audio information may include information about any surrounding environment that may endanger the safety of the user. For example, the real-time audio information may include, but is not limited to a vehicle honk, thunder, a human voice, an animal screaming and the like.

The sensing unit 310 may also include other types of sensors. For example, the sensing unit 310 may further include a humidity sensor 316, an odor sensor 318, a velocity sensor (not shown), an atmospheric pressure sensor (not shown) and the like. The humidity sensor 316 may be used to sense the humidity of the surrounding environment to determine a weather condition. The odor sensor 318 may be, for example, used to detect a type or several types of odors or gases of the surrounding environment. For example, these gases may be the gases which contain dangerous chemicals that endanger the user's safety, such as carbon monoxide or smoke. The velocity sensor may be, for example, used for sensing the velocity of a wearer 10 who wears the wearable device 100. The atmospheric pressure sensor may be, for example, used to sense the atmospheric pressure of the surrounding environment in order to determine the weather condition. Those of ordinary skill in the art may understand that the sensing unit 310 may also include any types of sensors already made or developed in the future for sensing the surrounding environment state. Alternatively, the wearable device 300 may further include a network communication unit 350, which may be connected to a network, such as the Internet 20, to acquire information. By means of the network communication unit 150, the wearable device 300 may receive, for example, a weather forecast from the network in order to acquire weather information of the surrounding environment.

Alternatively, in addition to the sensing unit 310, the wearable device 300 may also include a biological information sensor 360. The biological information sensor 360 is an instrument that is sensitive to a biological substance and is used to convert substance concentration into an electrical signal for detection.

In an embodiment, the biological information sensor 360 may be used to sense the biological information of a wearer 10 (namely, the user) who wears the wearable device 300. Biological information of the user may include a variety of information that characterizes a physiological condition of the user. For example, the biological information may include, but is not limited to a heart rate, a blood pressure, a body temperature, a respiratory rate, and the like.

The processor 320 in the wearable device 300 is used to determine the degree of danger based on various information acquired through the wearable device 300. Also, in response to the degree of danger, the processor 320 provides warning information. In detail, the processor 320 may be, for example, configured to analyze environment image information and environment audio information, and determine a degree of danger based on the above analysis.

In an embodiment, the processor 320 may be configured to analyze environment image information to acquire information that may endanger the safety of the user. The processor 320 may include the characteristic detection unit 120 of FIGS. 1 and 2. The processor 320 may detect a physical characteristic of a target object based on the environment image information transmitted by the sensing unit 310. The target object, for example, may be a vehicle, an animal, a person and the like. The vehicle, for example, may include, but is not limited to, a truck, a car, a motorcycle and the like. When the target object is an animal (such as a stray dog, a vicious dog, etc.), its physical characteristics may include, but are not limited to, teeth, tail and eyes of the animal. When the target object is a person, his/her physical characteristics may include, but are not limited to the face, trunk and limbs of the person. If the target object is moving, then the processor 320 may also determine a time taken by the target object to reach the wearable device 300, namely, the time taken by the target object to reach the user.

In another embodiment, the processor 320 may be configured to analyze the environment audio information to acquire information about an object that may endanger the safety of the user. For example, the processor 320 may extract an audio characteristic of the target object based on the environment audio information transmitted from the sensing unit 310. The target object, for example may include, but is not limited to a vehicle, an animal, a person and the like. When the target object is a vehicle, its audio characteristics may include, but are not limited to a honk frequency of the vehicle, etc. When the target object is an animal, its audio characteristics may include, but are not limited to, for example, a volume, a pitch and a Mel Frequency Cepstrum Coefficient (MFCC). When the target object is a person, his/her audio characteristics may include, but are not limited to, for example, human speech, a Power Normalized Cepstral Coefficient (PNCC), etc.

The processor 320 may also be configured to, based on the above-mentioned image and audio analysis, determine the degree of danger with respect to the target object. For example, the processor 320 may determine the degree of danger with respect to the target object based on the following three items.

The three items include a physical characteristic of the target object, the time taken by the target object to reach the corresponding wearable device 300, and an audio characteristic of the target object.

The processor 320 may also be configured to, based on a variety of extra factors, determine the degree of danger which is determined. In an embodiment, the processor 320 may determine the degree of danger based on weather information or odor information sensed by the sensing unit 310.

For example, when it is a rainy or snowy day, in terms of a slippery road, a vehicle may easily skid and thus an unexpected danger may arise; therefore, the degree of danger may be raised accordingly. As another example, when a toxic gas is detected by the sensing unit 310, the degree of danger also may be raised accordingly. In another embodiment, the processor 320 may determine the degree of danger based on the physiological condition information of the user sensed by the biological information sensor 360. For example, when a poor physiological condition of the user, such as a fast heart rate, high blood pressure, shortness of breath, etc. is sensed by the biological information sensor 360, the degree of danger may be raised accordingly.

The processor 320 is configured to provide warning information in response to the degree of danger. In some embodiments, the processor 320 is configured to acquire feedback information of the user who wears the wearable device 300, and then provide warning information based on the feedback information. For example, if the user inputs information about a high degree of danger factor, the processor 320 may provide warning information according to a high degree of danger. For example, the user may input a current weather or a health condition of the user, etc. In another embodiment, a system for early warning of danger may include a user preference database (for example, in which user preference data, such as reaction data or feedback data with respect to various dangers, is stored).

By searching the user preference database, the processor 320 may provide the warning information presented in a manner suitable for the user or that the user may like.

The warning unit 330 is configured to provide a warning based on the warning information provided by the processor 320. The warning unit 330 may include a variety of devices which are able to interact with the user, such as a speaker, a display, a vibrator, etc. in order to provide different manners of warning.

The manner of warning may be set according to a user preference. The user preference may include, but is not limited to, a visual manner, an audible manner, or a tactile manner, such as an image, a text, a sound, or a vibration respectively. In some embodiments, the wearable device 300 may include a third-party assistance function. For example, the wearable device 300 may further include a transmission unit 340. The transmission unit 340 may be configured to receive the information from other wearable devices (such as a wearable device worn by a user 40).

Such information may include, but is not limited to, biological information of wearers who wear other wearable devices and the information which is generated by the other wearable devices (such as the danger degree information generated by processors of the other wearable devices).

Further, the processor 320 may determine a degree of danger based on the information from the other wearable devices. By sharing information, the user may be provided with an early warning from the third party, and therefore the safety of the user may be increased.

The system for early warning of danger may include a shared database 30 so that the wearable device 300 may upload its own information to the shared database 30 in order to share the information with other devices. The receiving unit 210 of FIG. 2 may be included in the transmission unit 340.

In an embodiment, each wearable device may receive information from other wearable devices through the shared database 30.

In another embodiment, a connection may be established directly between two wearable devices for transmitting information. For example, a wearable device worn by an adult and a wearable device worn by a child may be paired to establish a direct connection. Therefore, two wearable devices may share information between each other.

The wearable device 300 may include, but is not limited to, a head-mounted device, a wrist-mounted device, a smart bracelet, a smart watch, and the like. Those of ordinary skill in the art may design the wearable device 300 as a device suitable for wearing and performing sensing through various sensors.

Figure 4:
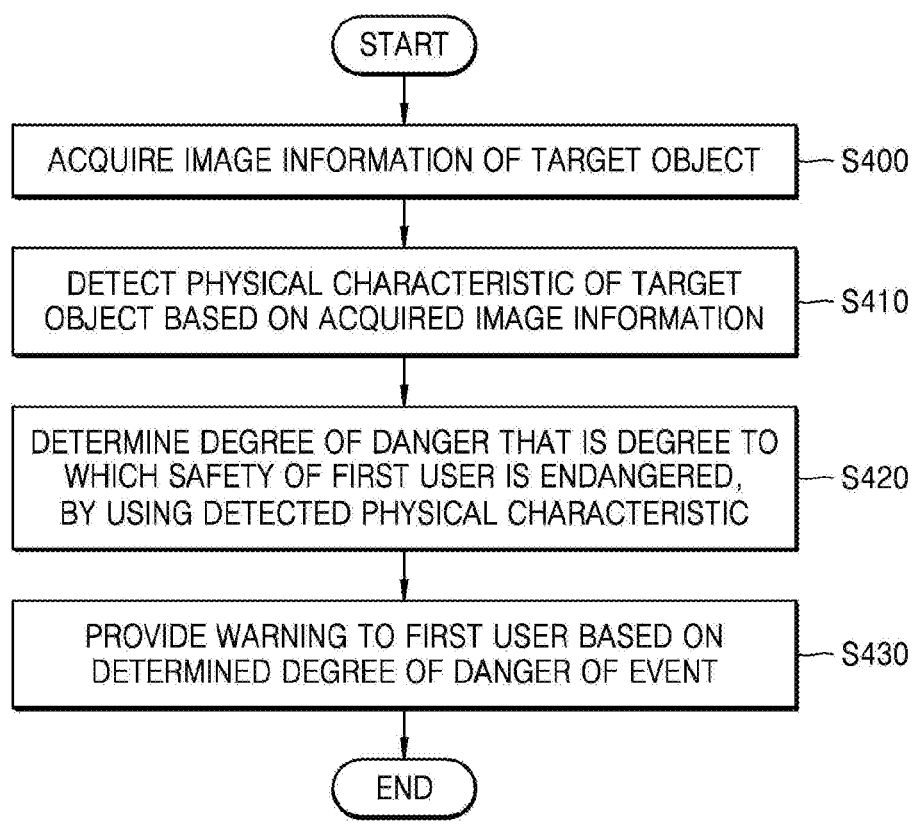
FIG. 4 is a flowchart showing a method for early warning of danger, according to an embodiment of the present application.

FIG. 4 is a flowchart showing a method for early warning of danger (hereinafter, early danger warning method), according to an embodiment of the present application.

In step S400, image information of a target object may be acquired. Also, the acquired information may be received through a second wearable device worn by a second user. In this regard, the information may include at least one of biological information of the second user, the image information, audio information, and information generated by the second wearable device. Also, weather information may be acquired by sensing a weather condition by using a sensor or receiving weather forecast over a network. The weather information or order information may also be acquired. In addition, biological information of a first user acquired through a first wearable device may be received.

In step S410, a physical characteristic of a target object may be detected based on the acquired image information.

In step S430, a degree of danger that is a degree to which the safety of a user is endangered, may be determined by using the detected physical characteristic. The degree of danger may be determined based on the information received from the second wearable device. A warning may be provided to the user based on the degree of danger of an event determined in step S430. Different warnings may be provided based on the biological information.

Figure 5:
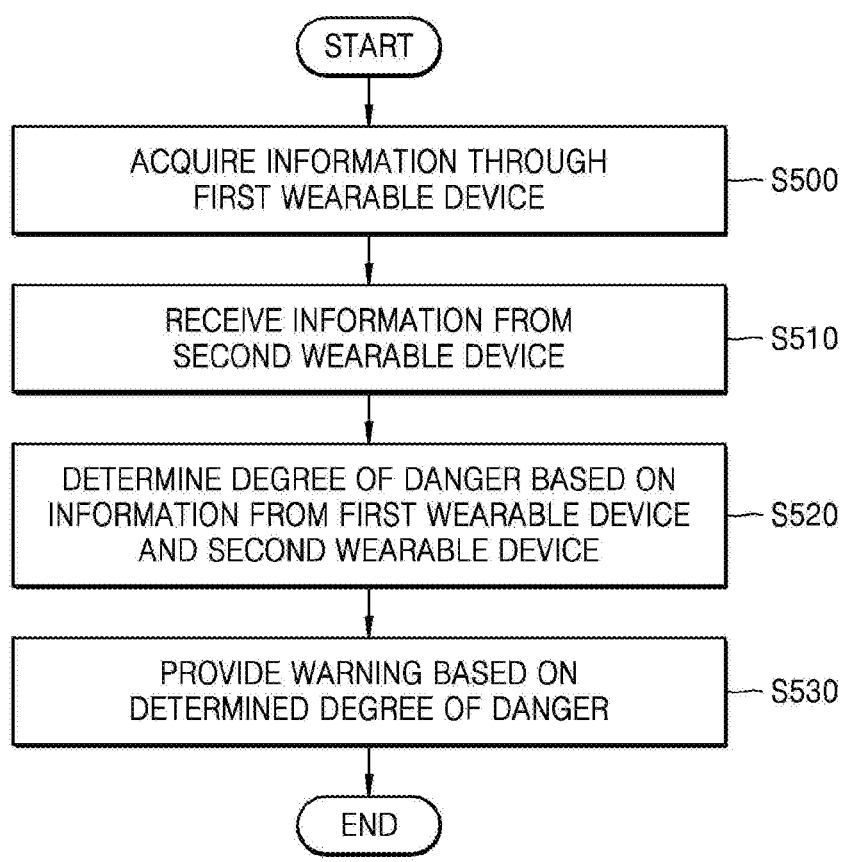
FIG. 5 is a flowchart showing a method for early warning of danger, according to another embodiment of the present application.

FIG. 5 is a flowchart showing an early danger warning method according to another embodiment of the present application.

In step S500, information of surrounding environment may be acquired through a wearable device.

In step S510, information which is acquired through a second wearable device worn by a second user may be received. In this regard, the information may include at least one of biological information of the second user and information generated by the second wearable device. Also, weather information may be acquired by sensing a weather condition by using a sensor or receiving a weather forecast over a network. The information may include the weather information or order information. In addition, biological information of a first user acquired through a first wearable device may be received.

In step S520, a degree of danger may be determined based on the acquired information. The degree of danger may be determined based on the information received from the second wearable device. The degree of danger may be determined based on the weather information or the order information. In addition, a physical characteristic of a target object may be detected, and a time taken by the target object to reach a corresponding wearable device based on image information may be determined. Also, an audio characteristic of the target object may be extracted based on audio information. A degree of danger with respect to the target object may be determined according to at least one of the physical characteristic of the target object, the time taken by the target object to reach the corresponding wearable device, and the audio characteristic of the target object. The audio characteristic of the target object may include at least one of a volume, a pitch, a Mel Frequency Cepstrum Coefficient (MFCC), human speech, a Power Normalized Cepstral Coefficient (PNCC), etc.

In step S530, a warning may be provided based on the determined degree of danger. Also, a means of providing warning information may be adjusted based on the biological information.

Figure 6:
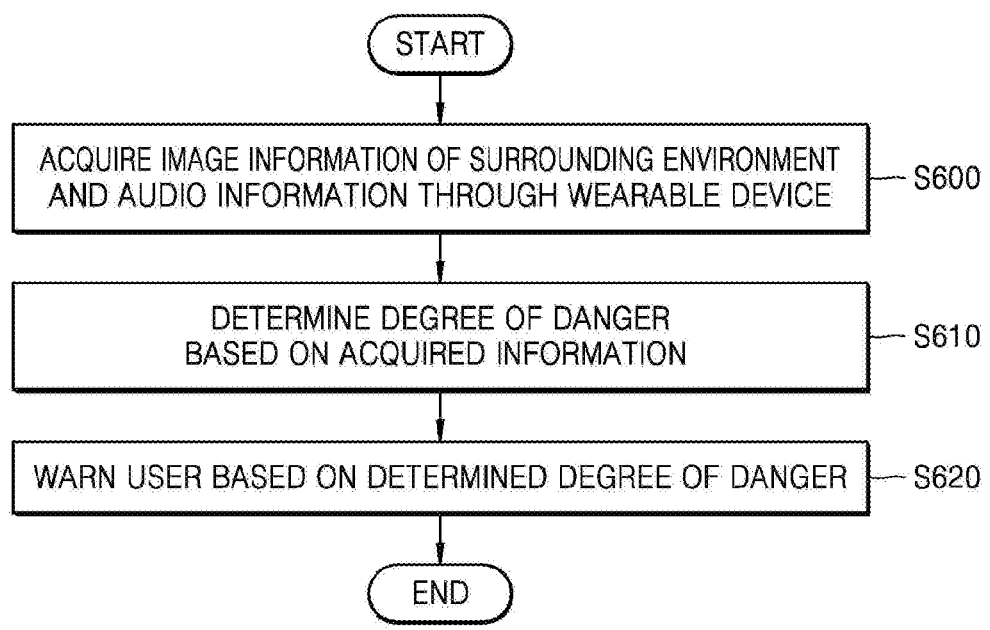
FIG. 6 is a flowchart for explaining an example of a method for early warning of danger, according to an embodiment of the present application.

FIG. 6 is a flowchart for explaining an example of an early danger warning method according to an embodiment of the present application.

In the following description, a "first wearable device" refers to the wearable device under discussion; a "second wearable device" refers to another wearable device having a similar function in addition to the wearable device under discussion. It should be understood that the using of "first" and "second" is not intended to limit the wearable device itself, it is just a way to provide a distinctive description.

In step S600, information is acquired through the first wearable device, wherein the information includes image information and audio information. For example, when a user is walking on the street or is staying indoors, there may be some potential dangers, such as a danger caused by a running vehicle, a danger caused by an animal nearby, a danger caused by a toxic gas in the air and a danger caused by a stranger's potential fraud.

In the present embodiment, the wearable device, worn by the user, may acquire surrounding environment information in order to detect a possible potential danger. In general, the surrounding environment information includes image information and audio information of the surrounding environment.

For example, when the user is walking on the street, the image information may include information of a running vehicle, information of a person or an animal and information of a behavior status of the person or the animal. The information of a plurality of images may also include a motion direction, a velocity and the like of the target object. The image sensor 312 shown in FIG. 3 may be used to sense the image information. The audio information may include a honk frequency of the running vehicle, a voice of a person close to the user, a screaming of an animal, and the like. The audio sensor 314 shown in FIG. 3 may be used to sense the audio information.

In step S610, a degree of danger is determined based on the acquired information. For example, the step specifically includes: determining whether a traveling direction of a vehicle is toward the user or away from the user according to the image information, then determining whether a distance between the vehicle and the user is too close meaning that the safety of the user is endangered. The step further includes: determining whether an animal nearby is in a state of anger and can hurt the user according to the audio information.

In step S620, warning information is provided according to the determined degree of danger. For example, the step includes that if the degree of danger is high, the user will be provided with the warning information to remind the user to leave a place or to change a walking direction. In some embodiments, a warning method may be set according to a scene or a user preference. Furthermore, the wearable devices may transmit feedback information of the user (such as reaction data or feedback data with respect to various dangers) to a user preference database for storing and later use.

The wearable device may acquire the feedback information of the user from the user preference database which stores the user preference, and may provide corresponding warning information based on the feedback information. For example, the manner of the warning may include, but is not limited to a visual manner, an auditory manner, and a tactile manner. Therefore, the content of the warning may include an image, a text, a sound or any combination of the above-mentioned items. In a further embodiment, different warning information may be provided based on the determined degree of danger. For example, when the degree of danger is low, the sound of the warning may be set with a low volume and a low frequency; when the degree of danger is high, the sound of the warning may be set with a high volume and a high frequency. Alternatively, when the degree of danger is high, a variety of warning manners may be employed at the same time, for example, a warning sound may be produced as well as a vibration may be created to warn the user. In other embodiments, the step includes that adjusting the manner of providing warning information based on the biological information of the user who wears the wearable device. Since the biological information of the user may reflect a physiological state or a mental state of the user, different physiological states or mental states may have different reactions and treatments with respect to an arriving danger.

Accordingly, based on different reactions and treatments, the wearable device may provide different manners of warning for the user. For example, when the mental state of the user is poor, presently he/she is unresponsive to the danger. In other words, it may be easy for him/her to overlook the danger. To avoid possible harm, the manner of warning taken by the wearable device may be more sensitive, for example, the wearable device may use a higher warning volume, a faster frequency, and the like.

The early danger warning method employs the wearable device to acquire the information; wherein the information may include image information and audio information. The wearable device determines a degree of danger based on the acquired information. The wearable device provides warning information to the user according to the determined degree of danger. In summary, the method provides a comprehensive and prompt early warning of danger for the user through a variety of sensors, and therefore improves safety of the user. Also, detection of danger not only includes detection of a vehicle but also includes detection of a creature, such as an animal or a person.

Figure 7:
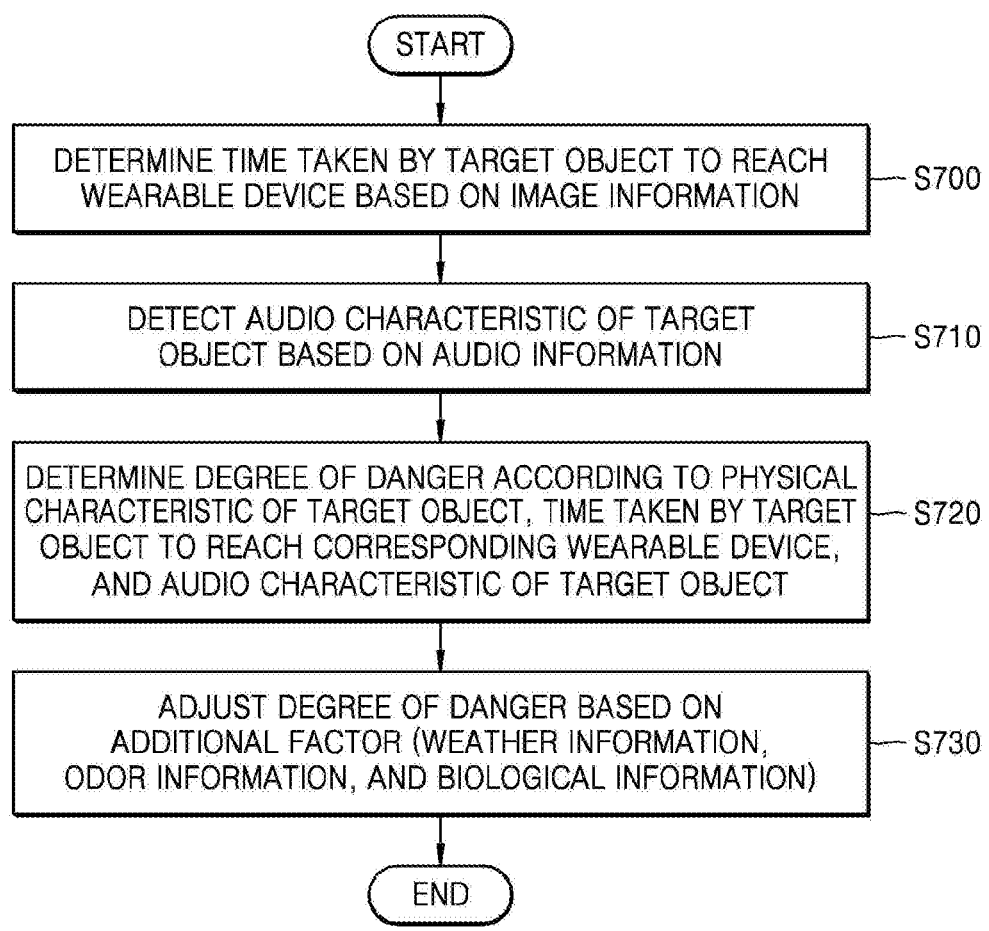
FIG. 7 is a flowchart for explaining another example of a method for early warning of danger.

FIG. 7 is a flowchart for explaining another example of an early danger warning method.

In step S700, a time taken by a target object to reach a corresponding wearable device is determined based on image information. The image information is analyzed to acquire information about an object which may endanger safety of a user. The image information may not only include images that are captured by a wearable device itself, but also include images that are captured by other wearable devices. For example, when two wearable devices are paired, these two devices may transfer data between each other. The data may include, but is not limited to respectively captured image information, audio information, and information generated by each wearable device (for example, a determined degree of danger).

In an embodiment, the step of analyzing the image information may include detecting a physical characteristic of a target object. In an embodiment, a shared characteristic may be used to detect various types of the target object. For example, the target object includes three types: a vehicle, an animal, a person. When the target object is an animal (such as a stray dog, a vicious dog, etc.); its physical characteristics may include, but are not limited to, teeth, tail and eyes of the animal. When the target object is a person, his/her physical characteristics may include, but are not limited to, the face, trunk and limbs of the person. The physical characteristic information of the person may be used to determine whether there is a possibility of fraud. Furthermore, the step of analyzing the image information may also include determining the time taken by the target object to reach the corresponding wearable device based on multiple images.

For example, multiple images may be used to determine a distance between the target object and the wearable device, a motion direction and a velocity of the target object. Therefore, the time taken by the target object to reach the corresponding wearable device may be calculated. The distance, the motion direction, and the velocity may be calculated in several ways. For example, the distance may be estimated by comparing an image size of the target object in the image with an actual size of the target object. The motion direction, for example, may be estimated according to an offset of the target object in the image. Those of ordinary skill in the art may understand that if the motion direction of the target object is not towards the user, the target object is unlikely to be dangerous.

In an embodiment, the step of analyzing the image information includes analyzing images from other wearable devices. For example, the first wearable device and the second wearable device are paired and share image information between each other. In this embodiment, the first wearable device may analyze the image information from the second wearable device, and may calculate a time taken by the target object to reach the second wearable device. Then the first wearable device may determine a time taken by the target object to reach the first wearable device based on a mutual positional relationship of the first wearable device and the second wearable device. In another embodiment, the second wearable device may share the time taken by the target object to reach the second wearable device with the first wearable device. Therefore, an amount of data transmitted may be reduced, and processing efficiency may be improved.

In step S710, an audio characteristic of the target object may be detected based on audio information. The audio information is analyzed to acquire the information about an object which may endanger the safety of the user. Likewise, the audio information not only may include audio information captured by the wearable device itself, but also include audio captured by other wearable devices. Specifically, the step of analyzing the audio information may include extracting an audio characteristic of the target object from the audio information.

According to a sound signal baseband decomposition and reconstruction technique, an interesting sound (for example, a sound of a vehicle, an animal, or a person) may be separated from a background sound. For example, when the target object is a vehicle, its audio characteristic may include, but is not limited to a honk frequency of the vehicle. When the target object is an animal, its audio characteristic may include, but is not limited to a volume, a pitch, a Mel Frequency Cepstrum Coefficient (MFCC), and the like. When the target object is a person, his/her audio characteristic may include, but is not limited to, human speech, a Power Normalized Cepstral Coefficient (PNCC), and the like.

In step S720, a degree of danger with respect to the target object may be determined based on the physical characteristic of the target object, the time taken by the target object to reach the corresponding wearable device, and audio characteristic of the target object. A degree of danger with respect to the target object may be determined based on an analysis of an image and audio information. In particular, the degree of danger with respect to the target object may be determined according to the physical characteristic and audio characteristic of the target object and the time taken by the target object to reach the corresponding wearable device.

In an embodiment, when the target object is a vehicle, a time taken by the vehicle to reach the user and a honk frequency of the vehicle may be weighted and discretized, and thus the degree of danger, namely, a degree of threat to the user, may be determined. In another embodiment, when the target object is an animal, a degree of threat of the animal (for example, a degree of anger and a degree of ferocity of the animal) may be determined according to the physical characteristic, audio characteristic and sound characteristic of the animal. Meanwhile, a probability of an attack from the animal may be determined according to a time taken by the animal to reach the user. Finally, the degree of threat and the probability may be weighted and discretized to determine a degree of threat of the animal, namely, a degree of danger. In another embodiment, when the target object is a person, the step of determining the degree of danger with respect to the target object may include determining whether the target object will cheat the user.

In step S730, the degree of danger may be determined based on an additional factor (weather information, odor information, and biological information). The degree of danger may be adjusted further based on a number of extra factors, in order to provide an accurate early warning.

In an embodiment, the degree of danger may be determined based on the weather information or the odor information. As previously mentioned, the weather condition may be sensed by a humidity sensor which is located inside a sensing unit of the wearable device. Alternatively, a weather forecast may be acquired through a network by a network communication unit of the wearable device. Further alternatively, a weather condition may be sensed by other types of sensors, such as a temperature sensor used for sensing temperatures; a sound sensor used for sensing sound of thunder, rain, wind and the like; an image sensor used for sensing the image of the rainy day, snowy day, sunny day, cloudy day, lightning day. In addition, an odor sensor may sense odor information.

It is understood that, for example, the degree of danger caused by a vehicle on a rainy day should be much higher than that on a sunny day, since on the rainy day the road will be slippery and is difficult to see. Therefore, because of these factors, a driver or a user is more likely to make mistakes, and a traffic accident occurs. In another embodiment, based on a biological information of a wearer (namely, the user) who wears the wearable device, the degree of danger may be adjusted. As mentioned above, the biological information of the user may reflect a physiological state or a mental state of the user. When the physiological state or the mental state is poor, the user is more vulnerable, for example more gullible. Therefore, the degree of danger may be raised accordingly.

Figure 8:
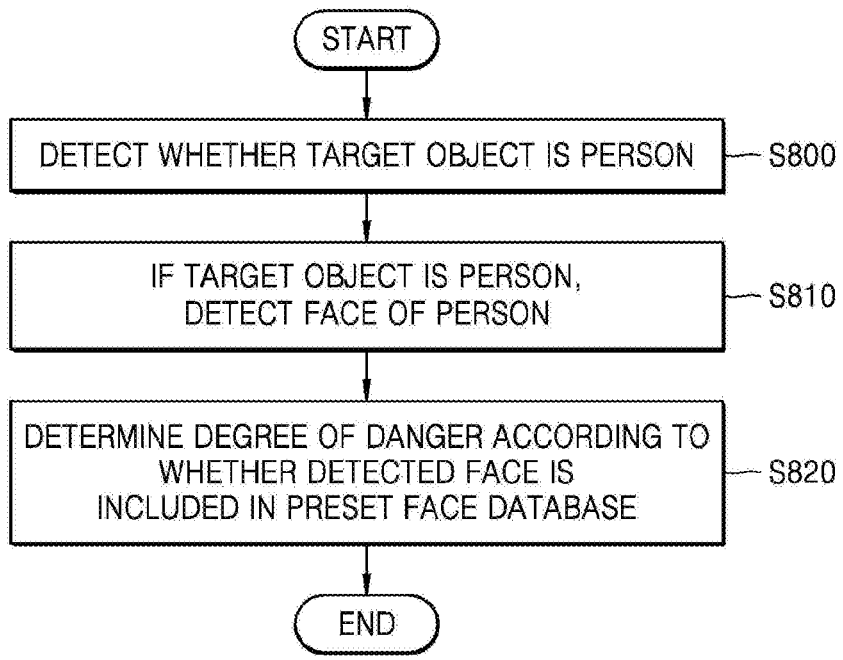
FIG. 8 is a flowchart for explaining another example of a method for early warning of danger.

FIG. 8 is a flowchart for explaining another example of an early danger warning method.

FIG. 8 shows how to determine a degree of danger with respect to a target object when the target object is a person. In an embodiment, the degree of danger with respect to the target object is mainly determined by a possibility of a fraud committed by the target object.

In step S800, it is detected whether the target object is the person.

In step S810, if the target object is the person, a face of a target person is detected.

In step S820, a degree of danger is determined according to whether the detected face is included in a preset face database. In this regard, a face that is not included in the face database may be determined as a stranger. It is understood that, in most cases, a danger is caused by the stranger; therefore this embodiment mainly focuses on a detection of a fraud committed by the stranger. The stranger is recognized according to image information or audio information acquired by the wearable device. In an embodiment, whether the target object is a stranger may be determined according to the image information. For example, a processor of the wearable device may detect a face according to the image information. A variety of face recognition technologies may be used to detect the face. In an embodiment, the Adaboost machine learning algorithm and the Haar-like feature may be used to detect the face. Further, whether the detected face is the face of the stranger may be determined by retrieving an acquaintances database. The acquaintances database is a database that has previously stored face image data of acquaintances of the user.

In another embodiment, whether the target object is a stranger may be determined according to the audio information. For example, the processor of the wearable device may perform voice recognition for the audio information. A variety of voice recognition technologies may be used to recognize a voice. In an embodiment, the target object may be recognized by a voiceprint recognition technology. Further, whether the detected voice is a voice of an acquaintance or a believable person may be determined by retrieving the acquaintances database. The acquaintances database also has previously stored voice data or audio characteristic data of acquaintances of the user.

It may be understood that, the aforementioned two embodiments may be combined arbitrarily. For example, in an implementation, the target object may be considered as an acquaintance only if the target object is recognized as an acquaintance by both embodiments. In another embodiment, the target object may be considered as an acquaintance as long as the target object is recognized as the acquaintance by either one of the aforementioned two embodiments.

Furthermore, whether the detected person is interacting with the user, namely, whether the detected person is talking to the user may be determined according to the image information. In other words, whether the target object is talking to the user is determined according to the physical characteristic. In an embodiment, the step of determination includes: firstly according to a face size of the target object, determining a distance between the target object and the user, for example, whether the distance is within a preset range; secondly according to a face position of the target object, determining whether the target object is facing the user; and finally determining whether the target object's lips are moving. If these three conditions are all satisfied at the same time, then the target object may be considered as the person who is talking to the user. In general, the stranger commits fraud through talking. Therefore, in an embodiment, a stranger who does not talk to the user may be excluded from investigation. This excluding step may be performed before, after, or between the step of face detection and the step of voice detection. This application is not limited in this respect.

A likelihood of a fraud may be determined based on one or more embodiments. These embodiments include but are not limited to, the speech, expression, action or the like of the target object. In an embodiment, voice content of the target object is analyzed based on a fraud reference model, in order to determine the likelihood of the fraud. The fraud reference model may be created by studying existing fraud cases. For example, the fraud reference model may be created by the following steps: collecting a variety of fraud cases from a network; and then using the Bayesian classifier to emulate a fraud language model.

In an embodiment, the audio information is analyzed by the processor of the wearable device. For example, the analyzing step specifically includes: firstly extracting the Power Normalized Cepstral Coefficient (PNCC) characteristic of the target object and then performing voice recognition; secondly splitting words and extracting sensitive words based on the Markov random field; and finally using the fraud reference model to predict the likelihood of the fraud.

For instance, when the target object says "please transfer 100,000 dollars to this bank card.", extracted sensitive words are "bank card" and "dollars". According to Bayes' theorem, the fraud probability P (fraud|"bank card", "money")=P ("bank card", "money"|fraud)*P (fraud)/P ("bank card", "money"), wherein P ("bank card", "money"|fraud) represents the probability that the keyword "bank card" and "money" appear simultaneously in all fraud cases. P (fraud) is a prior probability; P ("bank card", "money") is a priori probability that the keyword "bank card" and "money" appear simultaneously. These three probabilities may be determined by learning the fraud language model.

In another embodiment, the likelihood of the fraud may be estimated based on a facial feature (namely a facial expression) change of the target object. In an embodiment, the processor of the wearable device may be used to analyze the facial feature change of target object based on the image information. According to an analysis of psychology or praxiology, some facial feature changes may be used to imply corresponding psychological activities (for example, lying and the like). Therefore, the likelihood of the fraud may be assigned according to these special facial feature changes or a combination thereof. For example, the likelihood of the fraud is assigned based on psychology or praxiology. The likelihood of the fraud is adjusted based on a statistical analysis of some fraud cases. For example, the special facial feature changes include, but are not limited to, a relative displacement of the eyes, a relative change of an eyebrow shape, a change of a face color and the like. A template of the facial feature change and the likelihood of the fraud may be created. In an embodiment, the template may be a lookup table. Each piece of data in the lookup table is constituted by a retrieval index and the likelihood of the fraud.

For example, the retrieval index may be defined as: eyeballs moving to right side, eyebrows rising upwards, face turning a soft pink; a corresponding likelihood of the fraud is 0.7. In another embodiment, the likelihood of the fraud may be estimated based on a behavior action change of the target object. The processor of the wearable device may be used to analyze a behavior action change of target object based on the image information. According to the analysis of psychology or praxiology, some special behavior action changes may imply corresponding psychological activities (for example, lying and the like).

The likelihood of the fraud may be assigned according to these special behavior action changes or a combination thereof, for example the likelihood of the fraud is assigned based on psychology or praxiology. The likelihood of the fraud is adjusted based on a statistical analysis of some fraud cases. Special behavior action changes may include, but are not limited to, for example, touching the neck, shrugging and other activities. A template of the behavior action change and the likelihood of the fraud may be created. A detection of the behavior action change may be implemented in a variety of ways. For example, the detection step includes: firstly detecting hands by a skin color model and detecting shoulders by a skeleton analysis; secondly using the TLD (Tracking-Learning-Detection) tracking algorithm to track the hands and shoulders in order to acquire a sequence of trajectories of the hands/shoulders; and finally estimating the likelihood of the fraud based on a trajectory sequence.

For example, when a hand action touching neck is detected, the likelihood of the fraud for the hand is P (fraud|hand action touching neck); when shrugging is detected, the likelihood of the fraud for the shoulders is P (fraud|shrugging), then a comprehensive likelihood of the fraud may be P (fraud|hand action touching neck, shrugging) =P (fraud|hand action touching neck)+P (fraud|shrugging)−P (fraud|hand action touching neck)*P (fraud|shrugging).

It may be understood that, the above-mentioned three embodiments may be combined arbitrarily. For example, in an embodiment, the likelihood of the fraud, which is determined by each embodiment, may be calculated separately, and then three likelihoods of the fraud are weighted to determine a total likelihood of the fraud.

In general, an estimated likelihood of the fraud may be expressed by a percentage or by other numerical values. The likelihood of the fraud may be mapped to a corresponding degree of danger, in order to subsequently provide corresponding warning information according to the corresponding degree of danger. This method extends a scope of the danger detection and improves safety of the user.

It should be noted that although in the drawings a specific step order for the method is described, however, it does not require or imply that these steps must be performed in accordance with this specific order, and it is unnecessary to perform all the steps to achieve the result desired. Instead, an order of performing the steps depicted in the flowchart may be changed.

Figure 9:
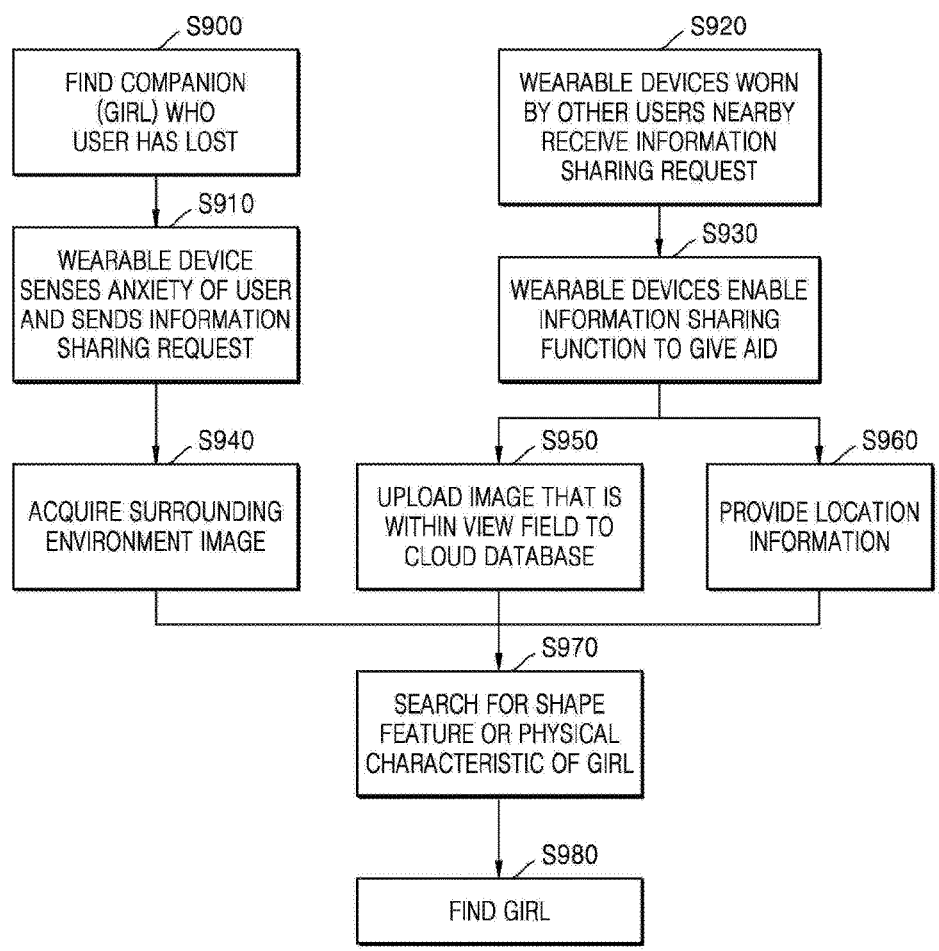
FIG. 9 is a flowchart for explaining an example of a method for early warning of danger.

FIG. 9 is a flowchart for explaining an example of an early danger warning method.

Referring to FIG. 9, a companion (such as a little girl) of a user gets lost in a street. When the user is very anxious, a wearable device of the present invention, which is worn by the user, senses an anxiety of the user by a biological information sensor, and transmits anxiety information to wearable devices nearby worn by other users. Then other users perceive this anxiety and open an image sharing function so that a view field of the user may be extended, therefore other users may more easily find the little girl who has lost in the street.

In step S900, the user finds that the companion (the little girl) gets lost.

In step S910, the wearable device worn by the user (a first wearable device) senses a physiological state of the user by the biological information sensor. When the first wearable device detects the anxiety of the user, it may request information sharing from one or more second wearable devices nearby. For example, the first wearable device may send an information sharing request to one or more second wearable devices nearby through a server of the early warning system. For another example, the first wearable device may directly broadcast the information sharing request in order to inform the second wearable devices nearby.

In step S920, the second wearable devices nearby worn by other users (that is, the second wearable devices) receive the information sharing request.

In step S930, these second wearable devices enable an information sharing function to give aid.

In step S950, the second wearable devices may upload an image that is within the view field, optionally along with audio information, to a cloud database in order to share with the first wearable device.

As shown in step S960, these second wearable devices may also provide their location information (for example, location information acquired through their GPS modules). At the same time, in step S940, the first wearable device may acquire a surrounding image for searching.

In step S970, a target is searched according to the information acquired by the first wearable device itself, and the information shared by one or more second wearable devices. For example, based on the image information, the little girl is searched according to her shape feature or physical characteristic.

In step S980, by a manner of information sharing, the view field of the user may be extended, therefore the little girl may be found more quickly.

In an embodiment, a searching function based on image processing may be performed in the server of the early warning system. Therefore, the workload of the first wearable device may be reduced. In another embodiment, the searching function based on the image processing may be distributed among other wearable devices, which may accelerate a processing speed.

It should be noted, a module (for example, a "unit") described in the embodiment of the present application not only may be implemented in the form of a software; but also may be implemented in the form of a hardware. The module described may be provided in a processor (e.g., the processor 320).

The device described herein may include a processor, a memory for storing program data and executing it, a permanent storage unit such as a disk drive, a communications port for handling communication with external devices, and user interface devices, including a touch panel, keys, buttons, etc. When software modules or algorithms are involved, these software modules may be stored as program instructions or computer-readable codes executable on a processor on a computer-readable recording medium. Examples of the computer-readable recording medium include magnetic storage media (e.g., ROM, floppy disks, hard disks, etc.), and optical recording media (e.g., CD-ROMs, or DVDs). The computer-readable recording medium may also be distributed over network coupled computer systems so that the computer-readable code is stored and executed in a distributed fashion. This media may be read by the computer, stored in the memory, and executed by the processor.

The present disclosure may be described in terms of functional block components and various processing steps. Such functional blocks may be realized by any number of hardware and/or software components configured to perform the specified functions. For example, the present disclosure may employ various integrated circuit (IC) components, e.g., memory elements, processing elements, logic elements, look-up tables, and the like, which may carry out a variety of functions under the control of one or more microprocessors or other control devices. Similarly, where the elements of the present disclosure are implemented using software programming or software elements, the present disclosure may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the present disclosure could employ any number of conventional techniques for electronics configuration, signal processing and/or control, data processing and the like. The words "mechanism", "element", "means", and "configuration" are used broadly and are not limited to mechanical or physical embodiments, but may include software routines in conjunction with processors, etc.

The particular implementations shown and described herein are illustrative examples of the present disclosure and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The use of the terms "a" and "an" and "the" and similar referents in the context of describing the present disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein may be performed in any suitable order unless otherwise indicated herein or otherwise clearly contradicted by context. The present disclosure is not limited to the described order of the steps. The use of any and all examples, or language (e.g., "such as") provided herein, is intended merely to better illuminate the present disclosure and does not pose a limitation on the scope of the present disclosure unless otherwise claimed. Numerous modifications and adaptations will be readily apparent to one of ordinary skill in the art without departing from the spirit and scope of the present disclosure.

The invention claimed is:

1. A method for early warning of danger, performed by a wearable device, the method comprising:
    acquiring, by an image sensor of the wearable device, image information of a target object;
    acquiring, by an audio sensor of the wearable device, audio information of a surrounding environment;
    detecting a physical characteristic of the target object based on the acquired image information;
    detecting an audio characteristic of the target object by separating the audio characteristic from a background sound based on the acquired audio information;
    determining a degree of danger that is a degree to which safety of a user is endangered, by using the detected physical characteristic and the audio characteristic; and
    providing a warning to the user based on the determined degree of danger.

2. The method of claim 1, wherein the determining of the degree of danger comprises:
    determining a time taken by the target object to reach the wearable device based on the image information; and
    determining the degree of danger with respect to the target object according to at least one of the physical characteristic of the target object, the time taken by the target object to reach the wearable device, and the audio characteristic of the target object.

3. The method of claim 1, wherein the physical characteristic of the target object comprises a face of a person, a trunk of the person, limbs of the person, teeth of an animal, a tail of the animal, or eyes of the animal.

4. The method of claim 1, wherein the audio characteristic of the target object comprises at least one of a volume, a pitch, a Mel Frequency Cepstrum Coefficient (MFCC), a human speech, and a Power Normalized Cepstral Coefficient (PNCC).

5. The method of claim 1,
    wherein the acquiring of the image information comprises: acquiring weather information or odor information, and
        wherein the determining of the degree of danger comprises: determining the degree of danger based on the weather information or the odor information.

6. The method of claim 1, wherein the providing of the warning comprises: providing the warning in different ways according to the degree of danger.

7. The method of claim 1, further comprising: receiving the acquired image information or audio information through a second wearable device,
  wherein the determining of the degree of danger comprises: determining the degree of danger based on information received from the second wearable device.

8. The method of claim 1,
  wherein the detecting of the physical characteristic comprises:
  detecting whether the target object is a person by using the image information; and
  if the target object is the person, detecting a face of the person, and
    wherein the determining of the degree of danger comprises: determining the degree of danger according to whether the detected face is included in a preset face database.

9. A computer-program product comprising a non-transitory computer-readable program including instructions, to be executed by one or more processors, for:
  acquiring, by an image sensor, image information of a target object;
  acquiring, by an audio sensor, audio information of a surrounding environment;
  detecting a physical characteristic of the target object based on the acquired image information;
  detecting an audio characteristic of the target object by separating the audio characteristic from a background sound based on the acquired audio information;
  determining a degree of danger that is a degree to which safety of a user is endangered, by using the detected physical characteristic and the audio characteristic; and
  providing a warning to the user based on the determined degree of danger.

10. A wearable device for early warning of danger, the wearable device comprising:
  an image sensor configured to acquire image information of a target object;
  an audio sensor configured to acquire audio information of a surrounding environment;
  a processor configured to detect a physical characteristic of the target object based on the acquired image information, detect an audio characteristic of the target object by separating the audio characteristic from a background sound based on the acquired audio information, and determine a degree of danger that is a degree to which safety of a user is endangered, by using the detected physical characteristic and the audio characteristic; and
  a warning unit configured to warn the user based on the determined degree of danger.

11. The wearable device of claim 10, wherein the processor determines a time taken by the target object to reach the wearable device based on the image information and determines the degree of danger with respect to the target object according to at least one of the physical characteristic of the target object, the time taken by the target object to reach the wearable device, and the audio characteristic of the target object.

12. The wearable device of claim 10, wherein the physical characteristic of the target object comprises a face of a person, a trunk of the person, limbs of the person, teeth of an animal, a tail of the animal, or eyes of the animal.

13. The wearable device of claim 10, wherein the audio characteristic of the target object comprises at least one of a volume, a pitch, a Mel Frequency Cepstrum Coefficient (MFCC), human speech, and a Power Normalized Cepstral Coefficient (PNCC).

14. The wearable device of claim 10, further comprising:
  another sensor configured to acquire weather information or odor information, and
    wherein the processor determines the degree of danger based on the weather information or the odor information.

15. The wearable device of claim 10, wherein the warning unit provides the warning in different ways according to the degree of danger.

16. The wearable device of claim 10, further comprising: a receiving unit configured to receive the acquired image information or audio information through a second wearable device,
  wherein the processor determines the degree of danger based on information received from the second wearable device.

17. The wearable device of claim 10,
  wherein the processor detects whether the target object is a person by using the image information and, if the target object is the person, detects a face of the person, and determines the degree of danger according to whether the detected face is included in a preset face database.

* * * * *